United States Patent
Jeong et al.

(10) Patent No.: US 12,003,381 B2
(45) Date of Patent: Jun. 4, 2024

(54) APPARATUS AND METHOD FOR CONFIGURING NETWORK OF FACTORY ENERGY MANAGEMENT SYSTEM

(71) Applicant: ELECTRONICS AND TELECOMMUNICATIONS RESEARCH INSTITUTE, Daejeon (KR)

(72) Inventors: Jin Doo Jeong, Daejeon (KR); Il Woo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 379 days.

(21) Appl. No.: 17/665,351

(22) Filed: Feb. 4, 2022

(65) Prior Publication Data
US 2022/0337483 A1    Oct. 20, 2022

(30) Foreign Application Priority Data
Apr. 8, 2021   (KR) .................. 10-2021-0045653

(51) Int. Cl.
*H04L 41/12*        (2022.01)
*H04L 41/0803*   (2022.01)

(52) U.S. Cl.
CPC ......... *H04L 41/12* (2013.01); *H04L 41/0803* (2013.01)

(58) Field of Classification Search
CPC . H04L 41/0806; H04L 41/12; H04L 41/0803; H04L 41/142; H04L 43/0817; H04L 69/26
See application file for complete search history.

(56) References Cited

U.S. PATENT DOCUMENTS

| | | | |
|---|---|---|---|
| 10,049,373 B2 * | 8/2018 | Takahashi | ............... G06Q 50/06 |
| 2010/0178919 A1 | 7/2010 | Deepak et al. | |
| 2017/0180150 A1 * | 6/2017 | Sato | ..................... H04L 12/2818 |

FOREIGN PATENT DOCUMENTS

| | | |
|---|---|---|
| KR | 10-2011-0112459 A | 10/2011 |
| KR | 20120070771 A | 7/2012 |

(Continued)

OTHER PUBLICATIONS

"Maki Endo et al., Simplified Factory Energy Management System based on operation condition estimation by sensor data", Aug. 20-24, 2012, 8th IEEE International Conference on Automation Science and Engineering (Year: 2012).*

(Continued)

*Primary Examiner* — Rasheed Gidado

(57) ABSTRACT

The method for configuring the network of a factory energy management system (FEMS) includes receiving a parameter set for configuration of the network, generating a diagram based on a characteristic for the parameter of each of communication schemes available for configuration of the network, determining, based on the diagram, a communication characteristic matrix including a characteristic value representing the characteristic for the parameter of each of the communication schemes, determining a correlation matrix representing a weight for the parameter in each process to be managed by the FEMS, deriving a communication adaptability matrix by applying the weight corresponding to the parameter for each process of the correlation matrix to the characteristic value for the parameter of each of the communication schemes included in the communication characteristic matrix, and determining a communication scheme to be applied for each process from among the communication schemes using the communication adaptability matrix.

12 Claims, 8 Drawing Sheets

(56) References Cited

FOREIGN PATENT DOCUMENTS

| KR | 10-2016-0053129 A | 5/2016 |
| KR | 102002995 B1 | 7/2019 |
| KR | 20190127035 A | 11/2019 |
| KR | 10-2020-0053379 A | 5/2020 |

OTHER PUBLICATIONS

Jin-Doo Jeong et al., "A Study on Industrial Wireless Communication for FEMS Networking", 2020, pp. 359-360, Energy & Environment ICT Research Department, ETRI.

R. Candell et al., "Guide to Industrial Wireless Systems Deployments", Apr. 2018, pp. 1-54, NIST.

\* cited by examiner

|  |  | First utility process | Second utility process | First system process | First step process | Second step process |
|---|---|---|---|---|---|---|
| Optical network | Low CAPEX | 24 | 24 | 16 | 16 | 16 |
|  | Low OPEX | 24 | 24 | 16 | 16 | 16 |
|  | Low cost | 24 | 16 | 16 | 16 | 16 |
|  | Low power | 96 | 64 | 64 | 64 | 32 |
|  | High reliability | 32 | 64 | 64 | 96 | 96 |
|  | Low latency | 32 | 64 | 64 | 96 | 96 |
|  | High data rate | 32 | 32 | 64 | 96 | 64 |
|  | Flexibility | 16 | 16 | 16 | 24 | 16 |
| LTE | Low CAPEX | 48 | 48 | 32 | 32 | 32 |
|  | Low OPEX | 24 | 24 | 16 | 16 | 16 |
|  | Low cost | 24 | 16 | 16 | 16 | 16 |
|  | Low power | 48 | 32 | 32 | 32 | 16 |
|  | High reliability | 32 | 64 | 64 | 96 | 96 |
|  | Low latency | 24 | 48 | 48 | 72 | 72 |
|  | High data rate | 32 | 32 | 64 | 96 | 64 |
|  | Flexibility | 48 | 48 | 48 | 72 | 48 |
| Wi-Fi | Low CAPEX | 72 | 72 | 48 | 48 | 48 |
|  | Low OPEX | 96 | 96 | 64 | 64 | 64 |
|  | Low cost | 72 | 48 | 48 | 48 | 48 |
|  | Low power | 24 | 16 | 16 | 16 | 16 |
|  | High reliability | 16 | 32 | 32 | 48 | 48 |
|  | Low latency | 24 | 48 | 48 | 72 | 72 |
|  | High data rate | 24 | 24 | 48 | 72 | 48 |
|  | Flexibility | 48 | 48 | 48 | 72 | 48 |
| LoRa | Low CAPEX | 96 | 96 | 64 | 64 | 64 |
|  | Low OPEX | 96 | 96 | 64 | 64 | 64 |
|  | Low cost | 96 | 64 | 64 | 64 | 64 |
|  | Low power | 96 | 64 | 64 | 64 | 32 |
|  | High reliability | 16 | 16 | 16 | 24 | 24 |
|  | Low latency | 16 | 16 | 16 | 24 | 24 |
|  | High data rate | 16 | 16 | 16 | 24 | 16 |
|  | Flexibility | 64 | 64 | 64 | 96 | 64 |

FIG. 7

APPARATUS AND METHOD FOR CONFIGURING NETWORK OF FACTORY ENERGY MANAGEMENT SYSTEM

CROSS-REFERENCE TO RELATED APPLICATION

This application claims the benefit of Korean Patent Application No. 10-2021-0045653 filed on Apr. 8, 2021, in the Korean Intellectual Property Office, the entire disclosure of which is incorporated herein by reference for all purposes.

BACKGROUND

1. Field of the Invention

One or more example embodiments relate to a technology for configuring a network of a factory energy management system (FEMS).

2. Description of the Related Art

A factory energy management system (FEMS) represents a system that predicts energy demand by identifying an energy use and operation status of equipment through information and communications technology (ICT) and adjusts an amount of energy supply to an appropriate scale accordingly. By using the FEMS, a target for improving energy efficiency may be set, and company-wide energy management of the management system may be systematically and continuously performed according to a predetermined procedure and technique so as to achieve the target.

In order to construct the FEMS for energy efficiency in an industrial sector, monitoring of an amount of energy consumption of energy resources in factories should be the basis. Wired communication has been mainly used for resource/device monitoring and control in the industrial sector in general, especially in a factory with many external factors of communication such as metal, dust, vibration, and the like.

SUMMARY

According to an aspect, there is provided a method for configuring a network of a factory energy management system (FEMS), the method including receiving a parameter set for configuration of the network, generating a diagram based on a characteristic for the parameter of each of communication schemes available for configuration of the network, determining, based on the diagram, a communication characteristic matrix including a characteristic value representing the characteristic for the parameter of each of the communication schemes, determining a correlation matrix representing a weight for the parameter in each process to be managed by the FEMS, deriving a communication adaptability matrix by applying the weight corresponding to the parameter for each process of the correlation matrix to the characteristic value for the parameter of each of the communication schemes included in the communication characteristic matrix, and determining a communication scheme to be applied for each process from among the communication schemes using the communication adaptability matrix.

The generating of the diagram may include receiving an input range for one parameter among the set parameters, receiving a value of the one parameter for one communication scheme among the available communication schemes, normalizing the input range and the value of the one parameter, deriving the characteristic value for the one parameter of the one communication scheme by multiplying the normalized value of the parameter by a resolution, and generating, based on the characteristic value, a diagram for the one communication scheme and the one parameter.

The parameter may be set based on an analysis on each process.

The method may further include adding a symbol corresponding to each value included in the communication adaptability matrix to the communication adaptability matrix.

The determining of the communication characteristic matrix may further include determining whether to add a communication scheme available for configuration of the network. When it is determined to add the communication scheme, the generating of the diagram may include generating a diagram based on a characteristic for the parameter of the added communication scheme.

At least one of a low operating expense (OPEX) characteristic, a low capital expenditure (CAPEX) characteristic, a flexibility characteristic, a high data rate characteristic, a high reliability characteristic, a low latency characteristic, a low power characteristic, and a low cost characteristic of the network may be set as the parameter.

According to another aspect, there is provided an apparatus for configuring a network of an FEMS, the apparatus including a memory including computer-executable instructions, and at least one processor configured to execute the instructions. When the instructions are executed by the processor, the processor may be configured to perform an operation of receiving a parameter set for configuration of the network, an operation of generating a diagram based on a characteristic for the parameter of each of the communication schemes available for configuration of the network, an operation of determining, based on the diagram, a communication characteristic matrix including a characteristic value representing the characteristic for the parameter of each of the communication schemes, an operation of determining a correlation matrix representing a weight for the parameter in each process to be managed by the FEMS, an operation of deriving a communication adaptability matrix by applying the weight corresponding to the parameter for each process of the correlation matrix to the characteristic value for the parameter of each of the communication schemes included in the communication characteristic matrix, and an operation of determining a communication scheme to be applied for each process from among the communication schemes using the communication adaptability matrix.

The operation of generating the diagram may include an operation of receiving an input range for one parameter among the set parameters, an operation of receiving a value of the one parameter for one communication scheme among the available communication schemes, an operation of normalizing the input range and the value of the one parameter, an operation of deriving the characteristic value for the one parameter of the one communication scheme by multiplying the normalized value of the parameter by a resolution, and an operation of generating, based on the characteristic value, a diagram for the one communication scheme and the one parameter.

The parameter may be set based on an analysis on each process.

The instruction may further include an operation of adding a symbol corresponding to each value included in the communication adaptability matrix to the communication adaptability matrix.

The operation of determining the communication characteristic matrix may further include an operation of determining whether to add a communication scheme available for configuration of the network. When it is determined to add the communication scheme, the operation of generating the diagram may include an operation of generating a diagram based on a characteristic for the parameter of the added communication scheme.

At least one of a low OPEX characteristic, a low CAPEX characteristic, a flexibility characteristic, a high data rate characteristic, a high reliability characteristic, a low latency characteristic, a low power characteristic, and a low cost characteristic of the network may be set as the parameter.

Additional aspects of example embodiments will be set forth in part in the description which follows and, in part, will be apparent from the description, or may be learned by practice of the disclosure.

According to example embodiments, through an apparatus and method for configuring a network of an FEMS, a communication adaptability matrix may be configured based on a network communication characteristic matrix and a correlation matrix, thereby configuring an optimal network to be applied to the FEMS.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 7 illustrates a communication adaptability matrix derived by a method for configuring a network of an FEMS according to an example embodiment.

DETAILED DESCRIPTION

Figure 1:
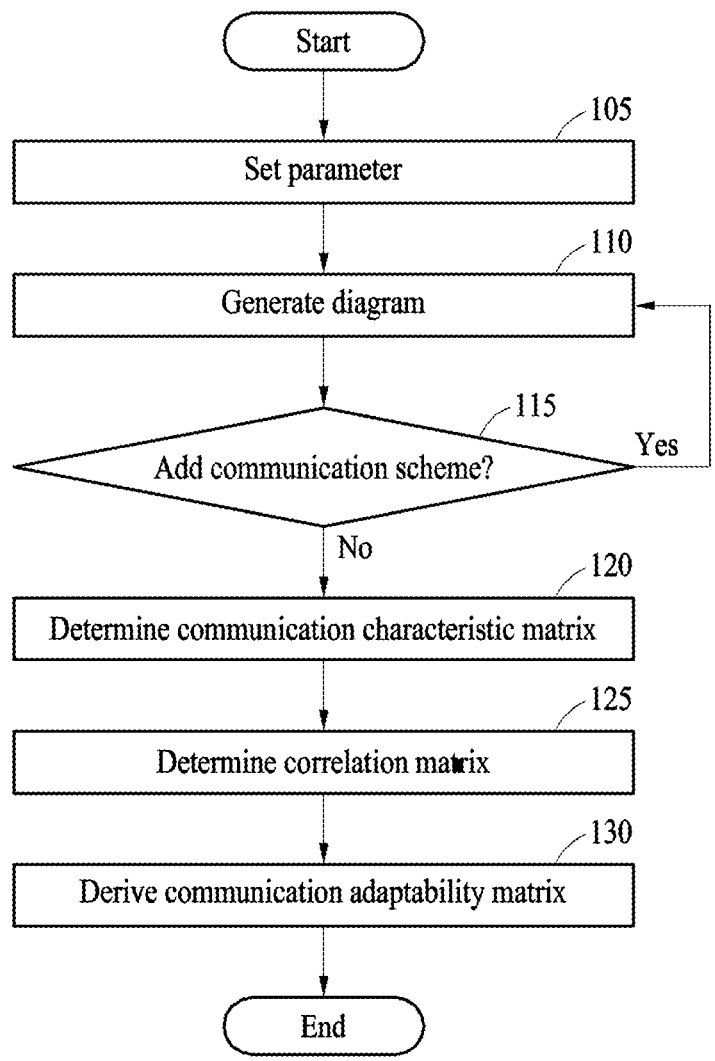
FIG. 1 illustrates a flowchart of an apparatus and method for configuring a network of a factory energy management system (FEMS) according to an example embodiment.

Hereinafter, example embodiments are described in detail with reference to the accompanying drawings. Various modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

When describing the example embodiments with reference to the accompanying drawings, like reference numerals refer to like components and a repeated description related thereto will be omitted. When describing the example embodiments, detailed description of well-known related structures or functions will be omitted when it is deemed that such description will cause ambiguous interpretation of the example embodiments.

FIG. 1 illustrates a flowchart of an apparatus and method for configuring a network of a factors energy management system (FEMS) according to an example embodiment.

When the FEMS is constructed to improve energy efficiency in a system that consumes an energy resource, it may be required to monitor an amount of energy used. In order for the FEMS to monitor the amount of energy used, it may be required to sense an amount of energy used by each process that uses energy and process the amount of energy used in a comprehensive manner. Here, the process may represent a procedure performed in a system to be managed by the FEMS. For example, when the FEMS is constructed, a step performed in a factory may correspond to the process.

In general, wired communication has been mainly used between energy resources, sensors, control devices, and monitoring devices in an industrial sector such as a factory with many external factors of communication such as metal, dust, vibration, and the like. However, with the development of a wireless communication technology, the wireless communication technology may be also used for network construction of the FEMS in the industrial sector such as the factory so as to lower a cost for network construction and improve step flexibility.

Through an apparatus (for example, a network configuration apparatus 800 of FIG. 8) (hereinafter, a network configuration apparatus) and a method (hereinafter, a network configuration method) for configuring a network of an FEMS according to an example embodiment, an communication scheme suitable for each process may be selected with respect to at least one process to be managed by the FEMS among wireless and wired communication technologies, and a method for configuring an optimal network for energy management may be derived.

In operation 105, factors to be considered so as to configure a network to be applied to the FEMS may be set as parameters, and inputted into the network configuration apparatus.

The parameters may be determined based on an analysis on a process to be managed by the FEMS. In an example embodiment, the parameters may be determined based on a due diligence on a factory to which the FEMS is to be introduced or an analysis on a factory design and factory equipment information.

The parameters, which represents factors affecting a network to be applied to the FEMS, may be determined by analyzing the factors affecting the network in various aspects such as a network function, economic feasibility, step flexibility, and the like.

TABLE 1

| | |
|---|---|
| Communication quality aspect | High data rate, High reliability, and Low latency |
| Construction/operation cost aspect | Low capital expenditure (CAPEX) and Low operating expense (OPEX) |
| Terminal aspect | Low cost and Low power |
| Step reconfiguration aspect | Network flexibility |

In an example embodiment, as illustrated in Table 1, a high data rate characteristic, a high reliability characteristic, and a low latency characteristic may be set as parameters in a communication quality aspect, a low CAPEX characteristic and a low OPEX characteristic may be set as parameters in a construction and operation cost aspect, a low cost characteristic and a lower power characteristic may be set as parameters in a terminal aspect, and a network flexibility characteristic may be set as a parameter in a step reconfiguration aspect. Here, the communication quality aspect may be considered for real-time control of a step performed in a factory, the construction and operation cost aspect may be considered for efficiency of factory operation and a low network CAPEX, and the terminal aspect may be considered in relation to to the number of targets to be monitored and a terminal closely related to a battery power source, and the step reconfiguration aspect may be considered for step flexibility.

For example, the high data rate characteristic, high reliability characteristic, and low latency characteristic, which are parameters set in the communication quality aspect, may be set based on the following analysis. The high data rate characteristic, high reliability characteristic, and low latency characteristic may be parameters that need to be considered so as to perform factory automation through monitoring and automatic control of a workflow or step, or to achieve optimization of energy efficiency based on real-time control of the step. In particular, the high reliability characteristic and low latency characteristic may be characteristics that 5G ultra reliable low latency communication (URLLC), which is highly likely to be used for smart city and smart factory applications, desires to achieve, and thus may be set as parameters.

The low CAPEX characteristic and low OPEX characteristic, which are parameters set in the construction and operating cost aspect, may be set based on the following analysis. In an industry or a factory that need to generate profits through product production and sales, the cost aspect may need be considered, and a cost of constructing an FEMS network (CAPEX) and a cost of operating the FEMS network (OPEX) in addition to a communication function oriented in the FEMS network may be set as parameters because the costs are important in configuring the FEMS network suitable for the factory.

The low cost characteristic and low power characteristic, which are parameters set in the terminal aspect, may be set based on the following analysis. As in 5G massive-Internet of Things (IoT) communication for monitoring a large quantity of sensors, a terminal cost for monitoring a large quantity of energy resources in operating an FEMS system may be important in configuring the FEMS network, and thus may be set as a parameter. A scheme of monitoring many energy sensors may generate an environment in which it is difficult to connect a constant power source to all sensors, and thus a terminal battery aspect may also need to be considered. The low power characteristic required for a terminal with a built-in battery may be also important in the terminal aspect, and thus may be set as a parameter.

The network flexibility characteristic, which is a parameter set in the step reconfiguration aspect, may be set based on the following analysis. In order to change a step or workflow frequently and smoothly in relation to a flexible step required by a smart factory in the era of the 4th industrial revolution, the FEMS network may also need to be flexibly reconfigured, and thus the network flexibility characteristic may be set as a parameter.

However, parameter setting is not limited thereto, and various parameters may be set according to a purpose of configuring a network, a working environment of each factory, a communication channel environment, a step flow, and an energy resource to be used.

In operation 110, a network configuration apparatus may represent, based on a set parameter, a characteristic of a parameter of each of communication schemes available for configuration of a network to be applied to an FEMS, as a diagram.

The available communication schemes may include, for example, optical network communication widely used in an industry and a factory, LTE communication providing stable communication quality, Wi-Fi communication that is built in a smart device as a wireless communication scheme and has high utilization, and long range (LoRa) communication with a low power long range communication characteristic. However, the communication schemes are not limited thereto, and may include any type of communication technology applicable to a factory as a communication technology. Hereinafter, a method for representing a diagram is described by exemplifying some of the communication schemes available for configuration of the network with reference to FIGS. 2 to 6.

In operation 115, the network configuration apparatus may determine whether to add a communication scheme. When evaluation of other communication schemes than a communication scheme generated as a diagram in operation 110 is additionally required, the network configuration apparatus may return to operation 110 to determine a characteristic related to a parameter for the added communication scheme, and represent the characteristic as a diagram for the added communication scheme.

In an example embodiment, a criterion for determining whether to add a communication scheme may be predetermined. In another example embodiment, the criterion for determining whether to add a communication scheme may be inputted in operation 115. In another example embodiment, when a new communication scheme is additionally inputted in operation 115 without the criterion for determining whether to add a communication scheme, the network configuration apparatus may return to operation 110 to represent a characteristic related to a parameter of the added communication scheme, as a diagram.

When it is determined not to add the communication scheme, the network configuration apparatus may proceed to operation 120. In an example embodiment, operation 115 may be omitted.

In operation 120, the network configuration apparatus may determine a communication characteristic matrix from a diagram for each of the communication schemes.

The communication characteristic matrix may be determined to include available communication schemes, parameters set in operation 105, and characteristic values representing characteristics for parameters of each of the communication schemes. For example, when parameters are set as illustrated in Table 1, and optical network communication, LTE communication, Wi-Fi communication, and LoRa communication are included in the available communication schemes, the communication characteristic matrix may be determined as illustrated in Table 2.

TABLE 2

| | \multicolumn{7}{c|}{Parameter} | |
|---|---|---|---|---|---|---|---|
| | Low CAPEX | Low OPEX | Low cost | Low power | High reliability | Low latency | High data rate | Flexibility |
| Optical network | | | | | | | | |
| LTE | | | | | | | | |
| Wi-Fi | | | | | | | | |
| LoRa | | | | | | | | |

As illustrated in Table 2, the communication characteristic matrix may be determined to include communication schemes available for configuration of the network and parameters. In the blanks of Table 2, a characteristic value of each communication scheme corresponding to each parameter may be entered as a numerical value, and this numerical value may be determined in the diagram generation process of operation 110. Through the communication characteristic matrix, it is possible to compare and analyze communication schemes available for configuration of the network to be applied to the FEMS.

In operation 125, the network configuration apparatus may determine a correlation matrix representing a weight for a parameter for each process to be managed by the FEMS. In an example embodiment, the correlation matrix may be determined based on a due diligence on a factory to which the FEMS is to be introduced or an analysis on a factory design and factory equipment information in a similar manner as parameter setting.

A communication scheme used for network configuration of the FEMS may be determined differently for each process according to a characteristic of each process that is an energy management target.

In general, processes related to energy resources used in a factory may be divided into a utility process, a system process, and a step process according to processes of production, transmission, and consumption. The utility process, which relates to equipment that produces the energy resources used in the factory, may produce water, air, gas, electricity, and steam (WAGES) that are the energy resources used in the factory by receiving electricity or water. The electricity and water inputted into the factory may be used as it is. However, compressed air, cold water, steam, and the like may be produced by converting electricity or water using equipment. The system process may represent equipment that transfers WAGES energy resources produced in a factory utility process to a step required for product production. The step process may represent equipment that processes a material or article to produce a final product using the energy resources received from the system process.

The FEMS may monitor and analyze information on production and consumption of energy for each of the utility process, the system process, and the step process to manage supply and demand of energy or control equipment, thereby achieving optimization of energy efficiency. Therefore, it may be required to analyze importance and relevance of a network for each process so as to configure an optimal network in monitoring energy information on equipment for each process, or controlling the equipment.

In an example embodiment, the correlation matrix may represent the importance and relevance of the network for each process. In an example embodiment, when a first utility process, a second utility process, a first system process, a first step process, and a second step process are performed in a factory to which the FEMS is to be applied, the correlation matrix may be determined based on the parameters set in operation 105, as illustrated in Table 3.

TABLE 3

| | \multicolumn{5}{c|}{Process} |
|---|---|---|---|---|---|
| | First utility process | Second utility process | First system process | First step process | Second step process |
| Low CAPEX | | | | | |
| LowOPEX | | | | | |
| Low cost | | | | | |
| Low power | | | | | |
| High reliability | | | | | |
| Low latency | | | | | |
| High data rate | | | | | |
| Flexibility | | | | | |

In the blanks of Table 3, a weight for each parameter in each process may be determined as a numerical value.

In operation 130, the network configuration apparatus may derive a communication adaptability matrix based on the communication characteristic matrix and the correlation matrix. The communication adaptability matrix may be derived by applying a characteristic value for a parameter of each communication scheme included in the communication characteristic matrix to a parameter weight corresponding to the parameter for each process of the correlation matrix. For example, the communication adaptability matrix may be derived by multiplying the characteristic value by the parameter weight. In an example embodiment, to the communication adaptability matrix may be derived based on the parameters set in operation 105, as illustrated in Table 4.

TABLE 4

|  |  | First utility process | Second utility process | First system process | First step process | Second step process |
|---|---|---|---|---|---|---|
| Optical network | Low CAPEX Low OPEX Low cost Low power High reliability Low latency High data rate Flexibility |  |  |  |  |  |
| LTE | Low CAPEX Low OPEX Low cost Low power High reliability Low latency High data rate Flexibility |  |  |  |  |  |
| Wi-Fi | Low CAPEX Low OPEX Low cost Low power High reliability Low latency High data rate Flexibility |  |  |  |  |  |
| LoRa | Low CAPEX Low OPEX Low cost Low power High reliability Low latency High data rate Flexibility |  |  |  |  |  |

In the blanks of Table 4, a value obtained by multiplying a characteristic value of a parameter of each communication scheme included in the communication characteristic matrix by a parameter weight of the correlation matrix corresponding to the parameter may be entered.

The network configuration apparatus may select, based on the communication adaptability matrix, a communication scheme to be applied for each process, and may derive a network configuration method.

In an example embodiment, the network configuration apparatus may apply a symbol corresponding to each value included in the communication adaptability matrix to facilitate interpretation of the communication adaptability matrix.

Figure 2:
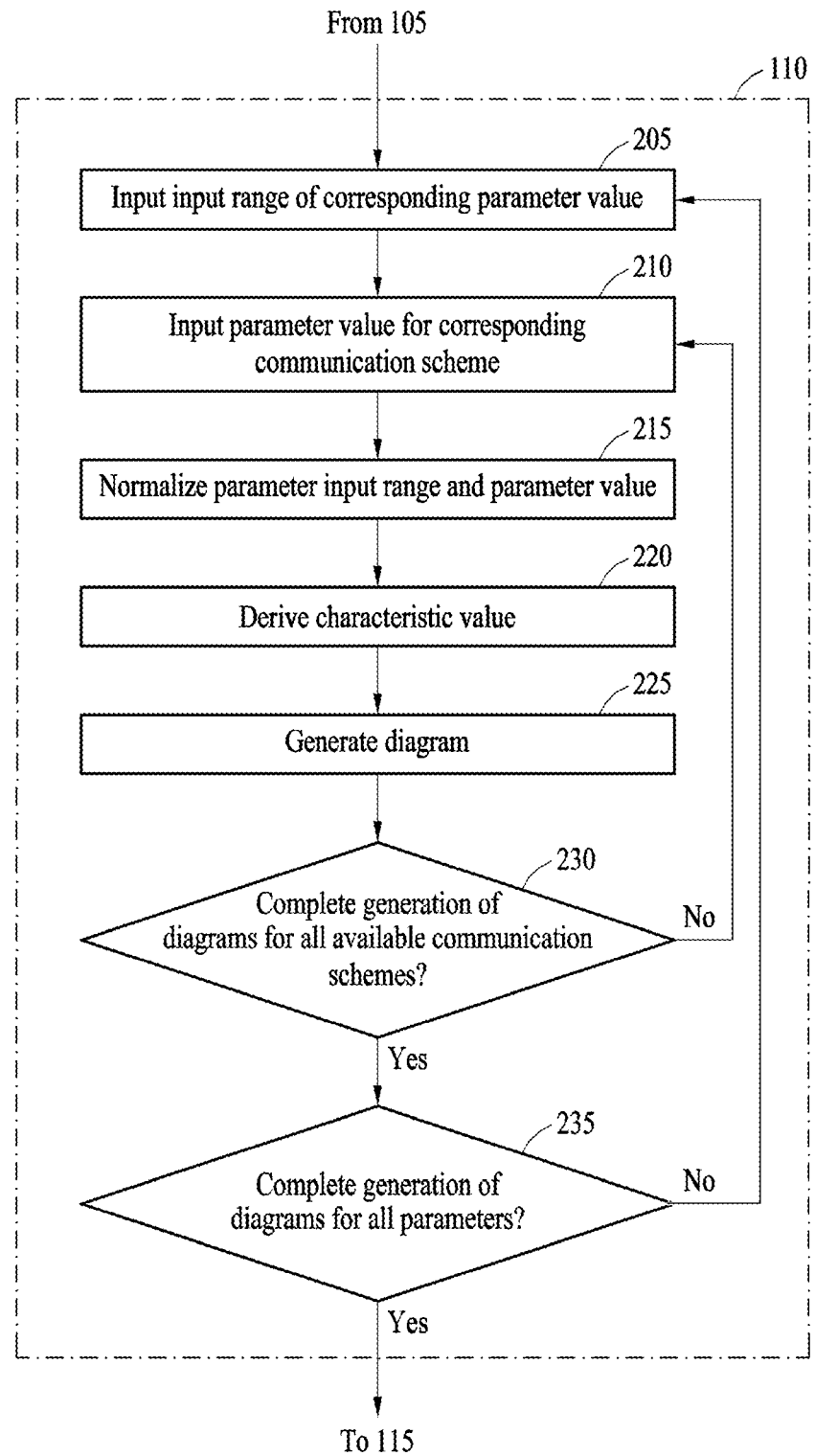
FIG. 2 illustrates a process of generating a diagram for a communication scheme by an apparatus and method for configuring a network of an FEMS according to an example embodiment.

FIG. 2 illustrates a process of generating a diagram for a communication scheme by an apparatus and method for configuring a network of an FEMS according to an example embodiment.

In operation 205, an input range for one parameter among the parameters set in operation 105 may be inputted into the network configuration apparatus. The one parameter may be arbitrarily selected from among the parameters set in operation 105. For example, a range between a lowest rate and a highest rate among transmission rates of available communication schemes with respect to a high data rate parameter may be inputted as an input range for the high data rate parameter in bits per second (bps) unit. When there are optical network communication, LTE communication, Wi-Fi communication, and LoRa communication as the available communication schemes, a transmission rate of an optical network communication scheme based on Gigabit Ethernet may be generally the highest with a maximum of 1000 Mbps, and LoRa communication that supports a rate of 0.3 to 10 kbps may have a lowest transmission rate. Therefore, the input range for the high data rate parameter may be inputted as 0.0003 to 1000 Mbps.

In operation 210, a corresponding parameter value for one communication scheme among the available communication schemes may be inputted into the network configuration apparatus. One communication scheme may be arbitrarily selected from among the available communication schemes. For example, when operation 210 is performed with respect to the optical network communication scheme among the available communication schemes such as optical network communication, LTE communication, Wi-Fi communication, and LoRa communication, 1000 may be inputted as a value of the high data rate parameter.

In operation 215, the network configuration apparatus may normalize an input range and a parameter value of the inputted parameter. Normalization may be performed so that a maximum value of an input range of each parameter is 1. For example, when operation 215 is performed with respect to the optical network communication scheme, the network configuration apparatus may perform normalization by dividing, for normalization, an input range of 0.0003 to 1000 Mbps and a high data rate parameter value of 1000 of the optical network communication scheme by 1000 that is a maximum value of the input range. By normalization, the input range may be converted into a range of 0.0000003 to 1, and the normalized high data rate parameter value of the optical network communication scheme may be 1.

In operation 220, the network configuration apparatus may multiply the normalized parameter value by a resolution in consideration of readability of a diagram to be generated and a magnitude of a value to be finally determined in the communication adaptability matrix. The network configuration apparatus may derive a characteristic value representing a characteristic of a corresponding parameter of a corresponding communication scheme by multiplying the normalized parameter value by the resolution. For example, the resolution may be 8, and the network configuration apparatus may calculate a characteristic value of 8 by multiplying the normalized high data rate parameter value of 1 of the optical network communication scheme by the resolution. However, the resolution is not limited thereto, and various values may be set, as necessary.

In operation 225, the network configuration apparatus may generate a diagram based on the parameter value calculated by multiplying the resolution in operation 215. For example, when operation 225 is performed with respect to the optical network communication scheme, the network configuration apparatus may generate a diagram for the high data rate parameter of the optical network communication scheme based on a high data rate parameter value of 8 multiplied by the resolution.

In operation 230, the network configuration apparatus may determine whether diagrams for all available communication schemes are generated with respect to a corresponding parameter. When no diagram for all available communication schemes is generated with respect to the corresponding parameter, the network configuration apparatus may return to operation 210 to perform operations 210 to 225 with respect to a communication scheme for which no diagram is generated with respect to the corresponding parameter. For example, with respect to the high data rate parameter, when a diagram is generated only for the optical network communication scheme among the available communication schemes, the network configuration apparatus may perform operations 210 to 225 with respect to an LTE communication scheme, which is another available communication scheme. Operations 210 to 230 may be repeated until generation of the diagrams for all available communication schemes with respect to the corresponding parameter is completed.

When operations 210 to 225 are performed with respect to the LTE communication scheme in relation to the high data rate parameter, the LTE communication scheme may support a transmission rate similar to that of Gigabit Ethernet, and thus 1000 may be inputted as the high data rate parameter value in operation 210. In operation 215, the network configuration apparatus may calculate 1 as a normalized high data rate parameter value for LTE communication by performing normalization based on the input range of 0.0003 to 1000 Mbps. The network configuration apparatus may multiply the normalized high data rate parameter value by a resolution of 8, and may generate a diagram based on the characteristic value of 8 for the high data rate parameter generated by multiplying the resolution in operation 225.

When operations 210 to 225 are performed with respect to a Wi-Fi communication scheme in relation to the high data rate parameter, it can be seen that a transmission rate of the Wi-Fi communication scheme supports a transmission rate of 700 Mbps in consideration of interference in an unlicensed band, and thus 700 may be inputted as the high data rate parameter value in operation 210. In operation 215, the network configuration apparatus may calculate 0.7 as a normalized high data rate parameter value for Wi-Fi communication by performing normalization based on the input range of 0.0003 to 1000 Mbps. The network configuration apparatus may multiply the normalized high data rate parameter value by the resolution of 8, and may generate a diagram based on a characteristic value of 5.6 for the high data rate parameter generated by multiplying the resolution in operation 225.

When operations 210 to 225 are performed with respect to a LoRa communication scheme in relation to the high data rate parameter, 0.01 may be inputted as the high data rate parameter value in operation 210. In operation 215, the network configuration apparatus may calculate 0.00001 as a normalized high data rate parameter value for LoRa communication by performing normalization based on the input range of 0.0003 to 1000 Mbps. The network configuration apparatus may multiply the normalized high data rate parameter value by the resolution of 8, and may generate a diagram based on a characteristic value of 0.00008 for the high data rate parameter generated by multiplying the resolution in operation 225.

When diagrams for all available communication schemes are generated with respect to one parameter, the network configuration apparatus may determine whether diagrams for all parameters is generated in operation 235. When no diagram for all parameters is generated, the network configuration apparatus may return to operation 205 to perform operations 205 to 230 with respect to a parameter for which no diagram is generated among the parameters set in operation 105. Operations 205 to 235 may be repeated until the diagrams for all parameters are generated.

For example, in operation 235, when diagrams for other parameters than the high data rate parameter among the parameters set in operation 105 are not drawn, the network configuration apparatus may receive an input range of a value of a low latency parameter for which no diagram is generated among the parameters set in operation 105, in operation 205. After operations 210 to 230 are performed with respect to the low latency parameter, operations 205 to 230 may be repeatedly performed with respect to each of a high reliability parameter, a low CAPEX parameter, a low OPEX parameter, a low cost parameter, a low power parameter, and a network flexibility parameter.

Among the parameters set in operation 105, there may be a parameter that is advantageous as a parameter value thereof is lower, such as a low latency parameter, and there may be a parameter that is advantageous as a parameter value thereof is higher, such as the high data rate parameter. An input range and a parameter value for the parameter that is more advantageous as the parameter value thereof is lower may be inputted as a reciprocal number, when inputted into the network configuration apparatus in operations 205 and 210. For example, when the available communication schemes have a minimum latency time of 1 ms and a maximum latency time of 1000 ms, an input range for the low latency parameter may be between 0.001, which is a reciprocal number of the maximum latency time, and 1, which is a reciprocal number of the minimum latency time (that is, a range of 0.001 to 1).

The parameter value for the parameter that is advantageous as the parameter value thereof is lower may be inputted as a reciprocal number even when inputted into the network configuration apparatus in operation 210. For example, when a latency time of the Wi-Fi communication scheme is 100 ms, 0.01, which is a reciprocal number of 100, may be inputted into the network configuration apparatus in operation 210.

Diagrams for respective communication schemes and respective parameters that are available in the forms illustrated in FIGS. 3 to 6 may be generated through operations 205 to 235.

Figure 3:
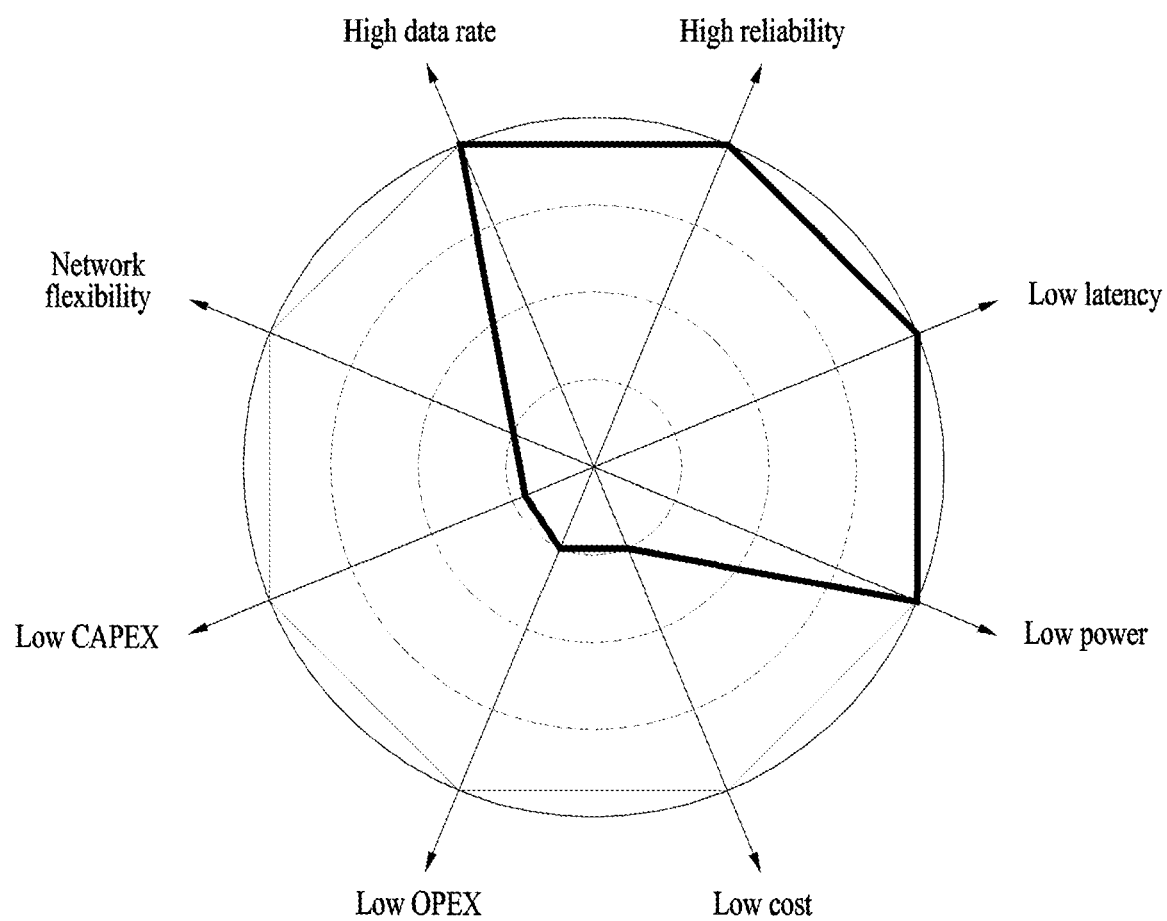
FIG. 3 illustrates a diagram of an optical network communication scheme generated by a method for configuring a network of an FEMS according to an example embodiment.

FIG. 3 illustrates a diagram of an optical network communication scheme generated by a method for configuring a network of an FEMS according to an example embodiment.

FIG. 3 illustrates a diagram based on characteristics of optical network communication for parameters set in the example embodiment of FIG. 1.

Optical network communication may be advantageous in that there are a high data rate characteristic, a high reliability characteristic, and a low latency characteristic, and may be disadvantageous in that a network construction and operation cost, such as a cost for network construction requires installation of an optical cable due to a wired network, a cost for maintenance of the optical cable, and a cost for network reconfiguration when a step is redeployed, is high. When the optical network communication is used, a high-performance communication network may be used. Conversely, a great expense may be required for construction and operation of a network. Therefore, the optical network communication scheme may be suitable for applications such as transmission and reception of important data such as worker safety, and real-time step control for efficiency and optimization of energy.

An input ranges of respective parameters and respective parameter values corresponding to the above-described characteristics of optical network communication may be inputted into a network configuration apparatus, and the network configuration apparatus may generate a diagram based on the parameter input ranges and the parameter values, as illustrated in FIG. 3. The diagram of optical network communication in FIG. 3 may be generated based on a value of 8 for the high data rate parameter, a value of 8 for the high reliability parameter, a value of 8 for the low latency parameter, a value of 8 for a low power parameter, a value of 2 for a low cost parameter, a value of 2 for a low network OPEX parameter, a value of 2 of a low network CAPEX parameter, and a value of 2 for a network flexibility parameter.

The diagram for optical network communication may be generated to have a high value with respect to the high data rate parameter, high reliability parameter, low latency parameter, and lower power parameter, and to have a low value with respect to the lower cost parameter, low OPEX parameter, low CAPEX parameter, and network flexibility parameter, by reflecting the above-described characteristics of optical network communication. Energy efficiency may be related to a cycle of battery replacement and a cost for replacement, and a constant power source may be used in wired communication such as optical network communication, and thus the low power characteristic may be high.

Figure 4:
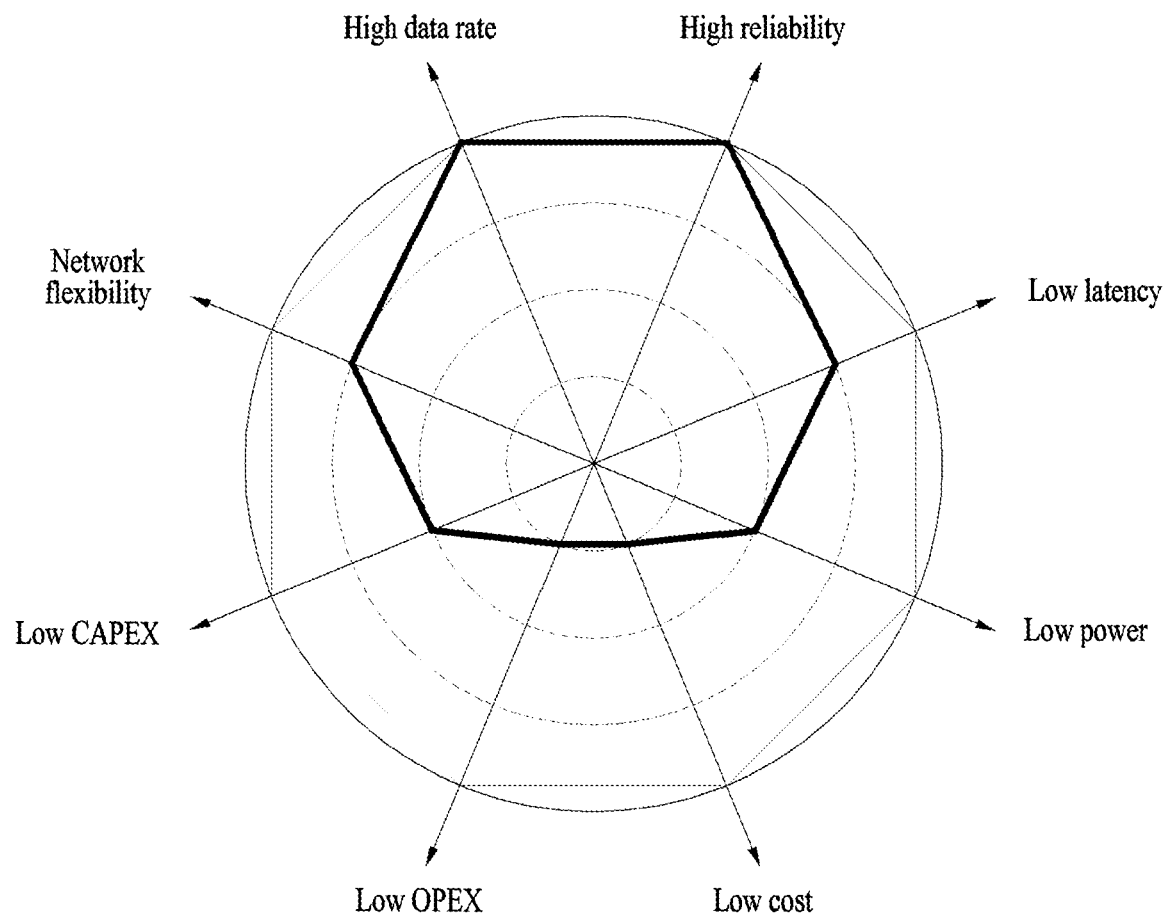
FIG. 4 illustrates a diagram of an LTE communication scheme generated by a method for configuring a network of an FEMS according to an example embodiment.

FIG. 4 illustrates a diagram of an LTE communication scheme generated by a method for configuring, a network of an FEMS according to an example embodiment.

FIG. 4 illustrates a diagram based on characteristics of LTE communication for parameters set in the example embodiment of FIG. 1.

Although LTE communication is not superior to optical network communication, LTE communication may be advantageous in that it has a high data rate characteristic, a high reliability characteristic, and a low latency characteristic, and enables long-distance wireless communication. LTE communication may be disadvantageous in that when LTE communication is used, a high network OPEX caused by a cost for communication of a terminal, a high terminal price, and low energy efficiency result in a high cost for frequent replacements of a battery. When a network is redeployed in LTE communication, it may be required to repurchase or additionally purchase the terminal. However, it may be easier to redeploy the network compared to wired optical network communication. LTE communication may use an already installed base station in a network CAPEX aspect. However, an initial terminal cost may be relatively high.

In order to generate a diagram, input ranges of respective parameters and respective parameter values corresponding to the above-described characteristics of LTE communication may be inputted into a network configuration apparatus, and the network configuration apparatus may generate a diagram based on the input ranges of the parameters and the parameter values, as illustrated in FIG. 4. The diagram of LTE communication in FIG. 4 may be generated based on a value of 8 for a high data rate parameter, a value of 8 for a high reliability parameter, a value of 6 for a low latency parameter, a value of 4 for a low power parameter, a value of 2 for a low cost parameter, a value of 2 for a low network OPEX parameter, a value of 4 of a low network CAPEX parameter, and a value of 6 for a network flexibility parameter that are calculated through operations 205 to 235 of FIG. 2.

Figure 5:
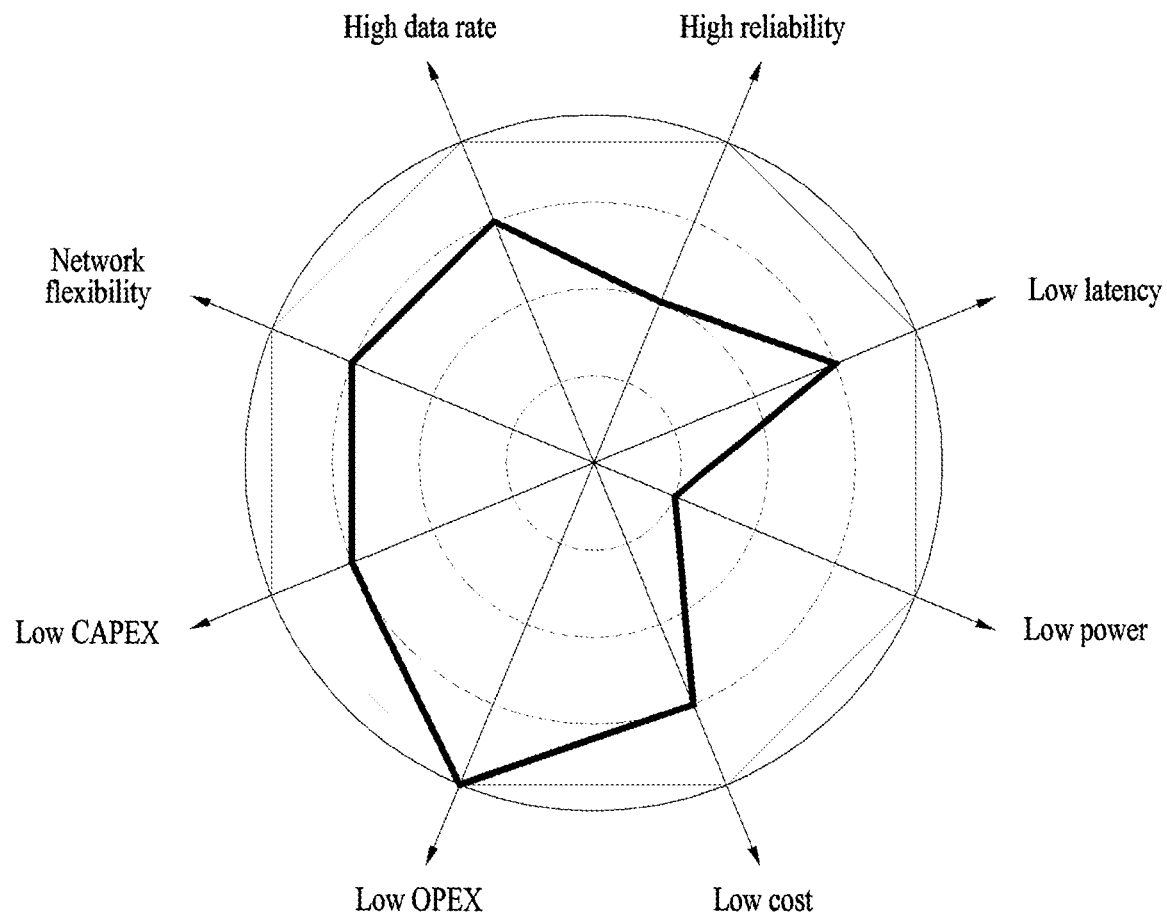
FIG. 5 illustrates a diagram of a Wi-Fi communication scheme generated by a method for configuring a network of an FEMS according to an example embodiment.

FIG. 5 illustrates a diagram of a Wi-Fi communication scheme generated by a method for configuring a network of an FEMS according to an example embodiment.

FIG. 5 illustrates a diagram based on characteristics of the Wi-Fi communication scheme for parameters set in the example embodiment of FIG. 1.

There may be a disadvantage in that Wi-Fi communication has a high data rate characteristic and a low latency characteristic, and has no communication cost as unlicensed band communication. However, it is known that Wi-Fi communication is often disconnected due to channel interference, and in particular, a disconnection phenomenon becomes more severe with the increasing number of adjacent terminals. Although Wi-Fi communication has low CAPEX and OPEX, and a relatively flexible network, there may be a disadvantage in that when the network is redeployed, a plurality of access points (APs) need to be redeployed due to a short communication distance.

In order to generate a diagram, input ranges of respective parameters and respective parameter values corresponding to the above-described characteristics of Wi-Fi communication may be inputted into a network configuration apparatus, and the network configuration apparatus may generate a diagram based on the input ranges of the parameters and the parameter values, as illustrated in FIG. 5. The diagram of Wi-Fi communication in FIG. 5 may be generated based on a value of 6 for a high data rate parameter, a value of 4 for a high reliability parameter, a value of 6 for a low latency parameter, a value of 2 for a low power parameter, a value of 6 for a low cost parameter, a value of 8 for a low network OPEX parameter, a value of 6 of a low network CAPEX parameter, and a value of 6 for a network flexibility parameter that are calculated through operations 205 to 235 of FIG. 2.

Figure 6:
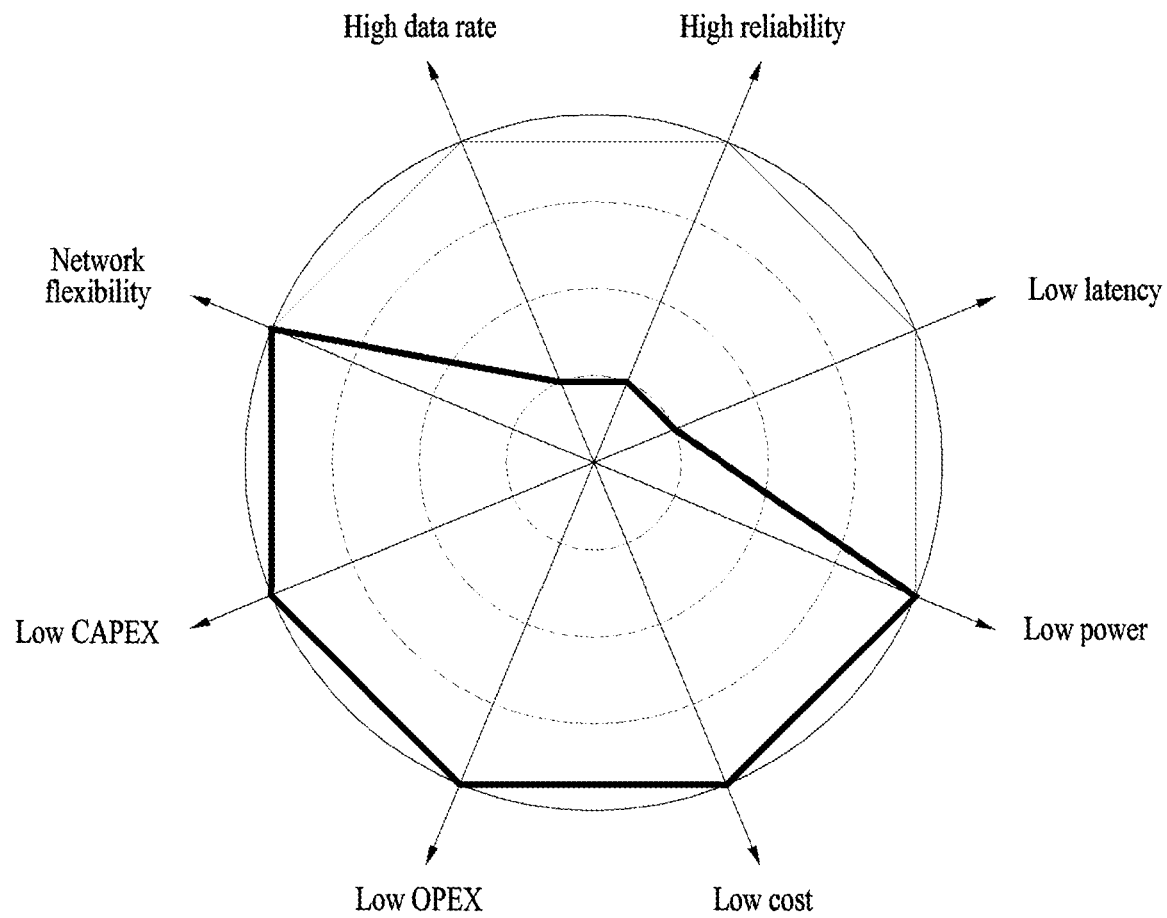
FIG. 6 illustrates a diagram of a LoRa communication scheme generated by a method for configuring a network of an FEMS according to an example embodiment.

FIG. 6 illustrates a diagram of a LoRa communication scheme generated by a method for configuring a network of an FEMS according to an example embodiment.

FIG. 6 illustrates a diagram based on characteristics of the LoRa communication scheme for parameters set in the example embodiment of FIG. 1.

LoRa communication, which is a communication scheme with low-power wide area (LPWA) communication characteristic, may achieve high energy efficiency through low power consumption suitable for IoT applications. LoRa communication may have a low terminal price, thereby reducing a cost of purchasing a terminal compared to other communication schemes even in large-scale energy monitoring. In addition, the low terminal price may be advantageous in an aspect of a low network CAPEX.

LoRa communication may be an unlicensed band communication scheme that does not require a communication cost, thereby reducing a network OPEX. LoRa communication may be a wireless communication scheme and support long-distance communication, and thus may be advantageous compared to wired communication in redeployment of a terminal or node resulting from redeployment of a step or work. However, LoRa communication may be insufficient compared to other communication schemes in a communication quality aspect including a high data rate, high reliability, and low latency, and thus may not be suitable for transmission and reception of important energy data requiring reliability or transmission and reception of real-time energy data requiring low latency, which may mean that LoRa communication is also not suitable for optimization of energy efficiency through step control. LoRa communication may be suitable for monitoring non-real-time large-scale sensing data, as in massive-IoT applications of 5G communication. The non-real-time large-scale sensing data may represent factory environment data such as temperature, humidity, and illuminance, and an amount of power of a factory utility process.

In order to generate a diagram, input ranges of respective parameters and respective parameter values corresponding to the above-described characteristics of LoRa communication may be inputted into a network configuration apparatus, and the network configuration apparatus may generate a diagram based on the input ranges of the parameters and the parameter values, as illustrated in FIG. 6. The diagram of LoRa communication in FIG. 6 may be generated based on a value of 2 for a high data rate parameter, a value of 2 for a high reliability parameter, a value of 2 for a low latency parameter, a value of 8 for a low power parameter, a value of 8 for a low cost parameter, a value of 8 for a low network OPEX parameter, a value of 8 of a low network CAPEX parameter, and a value of 8 for a network flexibility parameter that are calculated through operations 205 to 235 of FIG. 2.

FIG. 7 illustrates a communication adaptability matrix derived by a method for configuring a network of an FENS according to an example embodiment.

FIG. 7 illustrates a communication adaptability matrix derived based on parameters set in the example embodiment of FIG. 1 and the communication schemes of FIGS. 3 to 6.

In an example embodiment, a network configuration apparatus may determine a communication characteristic matrix based on the diagrams of the communication schemes of FIGS. 3 to 6, as in operation 120 of FIG. 1. The determined communication characteristic matrix may be illustrated in Table 5.

TABLE 5

|  | Parameter | | | | | | | |
|---|---|---|---|---|---|---|---|---|
|  | Low CAPEX | Low OPEX | Low cost | Low power | High reliability | Low latency | High data rate | Flexibility |
| Optical network | 2 | 2 | 2 | 8 | 8 | 8 | 8 | 2 |
| LTE | 4 | 2 | 2 | 4 | 8 | 6 | 8 | 6 |
| Wi-Fi | 6 | 8 | 6 | 2 | 4 | 6 | 6 | 6 |
| LoRa | 8 | 8 | 8 | 8 | 2 | 2 | 2 | 8 |

Table 5 illustrates an example in which contents of the diagrams according to the example embodiments of FIGS. 3 to 6 are reflected in a form of the communication characteristic matrix of Table 2. In Table 5, the network configuration apparatus may determine the communication characteristic matrix by representing a characteristic value for a parameter of each communication scheme as a numerical value, based on the diagrams in which characteristics of optical network communication, LTE communication, Wi-Fi communication, and LoRa communication of FIGS. 3 to 6 are reflected.

The network configuration apparatus may determine a correlation matrix representing a weight for a parameter in each process to be managed by an FEMS, as in operation 125 of FIG. 1.

In an example embodiment, when a first utility process, a second utility process, a first system process, a first step process, and a second step process are performed in a factory to which the FEMS is to be applied, the correlation matrix may be determined as illustrated in Table 6.

TABLE 6

|  | Process | | | | |
|---|---|---|---|---|---|
|  | First utility process | Second utility process | First system process | First step process | Second step process |
| Low CAPEX | 12 | 12 | 8 | 8 | 8 |
| Low OPEX | 12 | 12 | 8 | 8 | 8 |
| Low cost | 12 | 8 | 8 | 8 | 8 |

TABLE 6-continued

|  | Process | | | | |
|---|---|---|---|---|---|
|  | First utility process | Second utility process | First system process | First step process | Second step process |
| Low power | 12 | 8 | 8 | 8 | 4 |
| High reliability | 4 | 8 | 8 | 12 | 12 |
| Low latency | 4 | 8 | 8 | 12 | 12 |
| High data rate | 4 | 4 | 8 | 12 | 8 |
| Flexibility | 8 | 8 | 8 | 12 | 8 |

Table 6 illustrates an example in which processes according to an example embodiment and a weight related to each parameter of each process are reflected in a form of the correlation matrix of Table 3.

The correlation matrix of Table 6 may be determined based on a due diligence on a factory to which the FEMS is to be introduced or an analysis on a factory design and factory equipment information. The first utility process and the second utility process that produce an energy resource required for a step of a corresponding factory may place high importance on a network in a cost aspect including a CAPEX related to initial investment, a terminal cost, low power related to replacement of a battery, and a network OPEX rather than a communication quality aspect including high reliability, low latency, and a high data rate, which may be reflected in the correlation matrix based on the due diligence on the factory or the analysis on the factory design and factory equipment information, and weights for a low CAPEX parameter, a low OPEX parameter, a low cost parameter, and a low power parameter may be determined to be high, and weights for parameters corresponding to a high reliability characteristic, a low latency characteristic, a high data rate characteristic, and a flexibility characteristic may be determined to be low.

In a first step and a second step, in order to achieve optimization of energy efficiency through control, the communication quality aspect including high reliability and low latency may be important, and the correlation matrix may be determined so that a weight is high with respect to a corresponding parameter, as illustrated in Table 6.

The network configuration apparatus may derive the communication adaptability matrix based on the communication characteristic matrix of Table 5 and the correlation matrix of Table 6. The communication adaptability matrix may be derived by multiplying a characteristic value for a parameter of each communication scheme included in the communication characteristic matrix by a parameter weight corresponding to a corresponding parameter for each process of the correlation matrix. The derived communication adaptability matrix may be illustrated in Table 7.

TABLE 7

| | | First utility process | Second utility process | First system process | First step process | Second step process |
|---|---|---|---|---|---|---|
| Optical network | Low CAPEX | 24 | 24 | 16 | 16 | 16 |
| | Low OPEX | 24 | 24 | 16 | 16 | 16 |
| | Low cost | 24 | 16 | 16 | 16 | 16 |
| | Low power | 96 | 64 | 64 | 64 | 32 |
| | High reliability | 32 | 64 | 64 | 96 | 96 |
| | Low latency | 32 | 64 | 64 | 96 | 96 |
| | High data rate | 32 | 32 | 64 | 96 | 64 |
| | Flexibility | 16 | 16 | 16 | 24 | 16 |
| LTE | Low CAPEX | 48 | 48 | 32 | 32 | 32 |
| | Low OPEX | 24 | 24 | 16 | 16 | 16 |
| | Low cost | 24 | 16 | 16 | 16 | 16 |
| | Low power | 48 | 32 | 32 | 32 | 16 |
| | High reliability | 32 | 64 | 64 | 96 | 96 |
| | Low latency | 24 | 48 | 48 | 72 | 72 |
| | High data rate | 32 | 32 | 64 | 96 | 64 |
| | Flexibility | 48 | 48 | 48 | 72 | 48 |
| Wi-Fi | Low CAPEX | 72 | 72 | 48 | 48 | 48 |
| | Low OPEX | 96 | 96 | 64 | 64 | 64 |
| | Low cost | 72 | 48 | 48 | 48 | 48 |
| | Low power | 24 | 16 | 16 | 16 | 8 |
| | High reliability | 16 | 32 | 32 | 48 | 48 |
| | Low latency | 24 | 48 | 48 | 72 | 72 |
| | High data rate | 24 | 24 | 48 | 72 | 48 |
| | Flexibility | 48 | 48 | 48 | 72 | 48 |
| LoRa | Low CAPEX | 96 | 96 | 64 | 64 | 64 |
| | Low OPEX | 96 | 96 | 64 | 64 | 64 |
| | Low cost | 96 | 64 | 64 | 64 | 64 |
| | Low power | 96 | 64 | 64 | 64 | 32 |
| | High reliability | 8 | 16 | 16 | 24 | 24 |
| | Low latency | 8 | 16 | 16 | 24 | 24 |
| | High data rate | 8 | 8 | 16 | 24 | 16 |
| | Flexibility | 64 | 64 | 64 | 96 | 64 |

Table 7 illustrates an example in which values obtained based on the communication characteristic matrix of Table 5 and the correlation matrix of Table 6 are reflected in a form of the communication adaptability matrix of Table 4.

The network configuration apparatus may apply a symbol corresponding to each value included in the communication adaptability matrix to facilitate interpretation of the communication adaptability matrix, as illustrates in FIG. 7.

The network configuration apparatus may select a communication scheme to be applied for each process based on the communication adaptability matrix of FIG. 7, and may derive a network configuration method.

For example, in FIG. 7, it can be confirmed that optical network communication, which is advantageous in the communication quality aspect rather than in the cost aspect, is suitable for an FEMS including a first step process and a second step process. Conversely, in the communication adaptability matrix of FIG. 7, it can be confirmed that LoRa communication, which shows good characteristics in the first utility process and the second utility process, is suitable for an FEMS having a main function of energy monitoring-based power management in a utility process.

In the communication adaptability matrix of FIG. 7, it can be confirmed that LTE communication, which has excellent communication quality among wireless communication schemes, is also suitable for an FEMS that performs an energy management function in a step process in a similar manner as an optical network communication scheme.

In the communication adaptability matrix of FIG. 7, it can be confirmed that Wi-Fi communication, which is widely used for a computer, a smart device, and the like, has an intermediate level of communication quality while having an advantage in an aspect of network CAPEX and OPEX, and thus Wi-Fi communication is suitable for an FEMS including a utility process or a system process.

Figure 8:
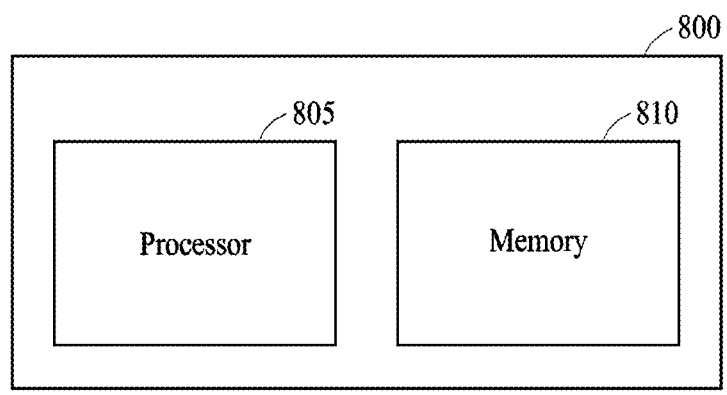
FIG. 8 illustrates a block diagram of configuration of an apparatus for configuring a network of an FEMS according to an example embodiment.

FIG. 8 illustrates a block diagram of configuration of an apparatus for configuring a network of an FEMS according to an example embodiment.

Referring to FIG. 8, a network configuration apparatus 800 may include a memory 810 including computer-executable instructions and at least one processor 805 that executes the instructions.

The memory 810 may store the computer-executable instructions, and the processor 805 may access the memory 810 to execute the instructions stored in the memory 810.

In an example embodiment, the processor 805 of the network configuration apparatus 800 may set factors to be considered so as to configure a network to be applied to an FEMS as parameters.

The parameters may be determined based on an analysis of a process to be managed by the FEMS. In an example embodiment, the parameters may be determined based on a due diligence on a factory to which the FEMS is to be introduced or an analysis on a factory design and factory equipment information.

The parameters, which represent factors affecting a network to be applied to the FEMS, may analyze the factors affecting the network in various aspects such as a network function, economic feasibility, step flexibility, and the like.

The parameters have been described above with reference to FIG. 1, and thus a repeated description will be omitted.

The processor 805 may represent a diagram based on parameter input ranges and parameter values for characteristics of each of communication schemes that are available for configuration of the network to be applied to the FEMS based on the set parameters. A process of generating a diagram based on the parameter input ranges and the parameter values has been described above with reference to FIG. 2, and thus a repeated description will be omitted. For example, the processor 805 may generate diagrams for an optical network communication scheme, LTE communication scheme, Wi-Fi communication scheme, and LoRa communication scheme, as illustrated in FIGS. 3 to 6.

The processor 805 may determine whether to add a communication scheme. When evaluation of other communication schemes than a communication scheme already generated as a diagram is additionally required, the processor 805 may identify characteristics related to parameters for the added communication scheme, and display the characteristics as a diagram for the added communication scheme.

In an example embodiment, a criterion for determining whether to add a communication scheme may be predetermined. In another example embodiment, when a new communication scheme is additionally inputted without the criterion for determining whether to add a communication scheme, the processor 805 may represent characteristics related to parameters of the added communication scheme as a diagram.

When it is determined not to add the communication scheme, the processor 805 may determine a communication characteristic matrix based on the generated diagram.

The processor 805 may determine a communication characteristic matrix from a diagram for each of the communication schemes. The communication characteristic matrix may be determined by representing a characteristic value for a parameter of each of the communication schemes as a numerical value. The numerical value may be determined based on the diagram. As illustrated in Tables 2 and 5, the communication characteristic matrix may be determined to include communication schemes available for network configuration and a parameter for each communication scheme. The communication characteristic matrix may be determined to include a characteristic value of each communication scheme corresponding to each parameter, the characteristic value represented as a numerical value.

The processor 805 may determine a correlation matrix representing a weight for a parameter in each process to be managed by the FEMS. In an example embodiment, the correlation matrix may be determined based on a due diligence on a factory to which the FEMS is to be introduced or an analysis on a factory design and factory equipment information in a similar manner as parameter setting. In this regard, the contents of Tables 3 and 6 may be applied in the same manner.

The processor 805 may derive a communication adaptability matrix by applying (for example, multiplying) a weight corresponding to a parameter for each process of the correlation matrix to a characteristic value of a parameter of each of the communication schemes included in the communication characteristic matrix. In this regard, the contents of Tables 4 and 7 may be applied in the same manner.

The processor 805 may determine a communication scheme to be applied for each process among the communication schemes based on the communication adaptability matrix. With respect to a method for determining a communication scheme, reference may be made to the above contents described with reference to FIG. 7.

The processor 805 may add a symbol corresponding to each value included in the communication adaptability matrix to the communication adaptability matrix so as to facilitate interpretation of the communication adaptability matrix.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The example embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter.

The described hardware devices may be configured to act as one or more software modules in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method for configuring a network of a factory energy management system (FEMS), the method comprising:
   receiving a parameter set for configuration of the network;
   generating a diagram based on a characteristic for the parameter of each of communication schemes available for configuration of the network;
   determining, based on the diagram, a communication characteristic matrix including a characteristic value representing the characteristic for the parameter of each of the communication schemes;

determining a correlation matrix representing a weight for the parameter in each process to be managed by the FEMS;

deriving a communication adaptability matrix by applying the weight corresponding to the parameter for each process of the correlation matrix to the characteristic value for the parameter of each of the communication schemes included in the communication characteristic matrix; and determining a communication scheme to be applied for each process from among the communication schemes using the communication adaptability matrix.

2. The method of claim 1, wherein the generating of the diagram comprises:

receiving an input range for one parameter among the set parameters;

receiving a value of the one parameter for one communication scheme among the available communication schemes;

normalizing the input range and the value of the one parameter;

deriving the characteristic value for the one parameter of the one communication scheme by multiplying the normalized value of the parameter by a resolution; and generating, based on the characteristic value, a diagram for the one communication scheme and the one parameter.

3. The method of claim 1, wherein the parameter is set based on an analysis on each process.

4. The method of claim 1, further comprising:

adding a symbol corresponding to each value included in the communication adaptability matrix to the communication adaptability matrix.

5. The method of claim 2, wherein the determining of the communication characteristic matrix further comprises determining whether to add a communication scheme available for configuration of the network, and the generating of the diagram comprises generating a diagram based on a characteristic for the parameter of the added communication scheme, when it is determined to add the communication scheme.

6. The method of claim 1, wherein at least one of a low operating expense (OPEX) characteristic, a low capital expense (CAPEX) characteristic, a flexibility characteristic, a high data rate characteristic, a high reliability characteristic, a low latency characteristic, a low power characteristic, and a low cost characteristic of the network is set as the parameter.

7. An apparatus for configuring a network of an FEMS, the apparatus comprising:

a memory including computer-executable instructions; and at least one processor configured to execute the instructions, wherein, when the instructions are executed by the processor, the processor is configured to perform the following operations:

an operation of receiving a parameter set for configuration of the network;

an operation of generating a diagram based on a characteristic for the parameter of each of the communication schemes available for configuration of the network;

an operation of determining, based on the diagram, a communication characteristic matrix including a characteristic value representing the characteristic for the parameter of each of the communication schemes;

an operation of determining a correlation matrix representing a weight for the parameter in each process to be managed by the FEMS;

an operation of deriving a communication adaptability matrix by applying the weight corresponding to the parameter for each process of the correlation matrix to the characteristic value for the parameter of each of the communication schemes included in the communication characteristic matrix; and an operation of determining a communication scheme to be applied for each process from among the communication schemes using the communication adaptability matrix.

8. The apparatus of claim 7, wherein the operation of generating the diagram comprises:

an operation of receiving an input range for one parameter among the set parameters;

an operation of receiving a value of the one parameter for one communication scheme among the available communication schemes;

an operation of normalizing the input range and the value of the one parameter;

an operation of deriving the characteristic value for the one parameter of the one communication scheme by multiplying the normalized value of the parameter by a resolution; and an operation of generating, based on the characteristic value, a diagram for the one communication scheme and the one parameter.

9. The apparatus of claim 7, wherein the parameter is set based on an analysis on each process.

10. The apparatus of claim 7, wherein the instruction further comprises an operation of adding a symbol corresponding to each value included in the communication adaptability matrix to the communication adaptability matrix.

11. The apparatus of claim 8, wherein the operation of determining the communication characteristic matrix further comprises an operation of determining whether to add a communication scheme available for configuration of the network, and the operation of generating the diagram comprises an operation of generating a diagram based on a characteristic for the parameter of the added communication scheme, when it is determined to add the communication scheme.

12. The apparatus of claim 7, wherein at least one of a low OPEX characteristic, a low CAPEX characteristic, a flexibility characteristic, a high data rate characteristic, a high reliability characteristic, a low latency characteristic, a low power characteristic, and a low cost characteristic of the network is set as the parameter.

* * * * *